United States Patent
Cacciatore et al.

(10) Patent No.: US 11,840,182 B2
(45) Date of Patent: Dec. 12, 2023

(54) VEHICLE ON-BOARD ELECTRICAL NETWORK SWITCH FOR MOTOR VEHICLES, ON-BOARD ELECTRICAL NETWORK FOR MOTOR VEHICLES AND METHOD FOR OPERATING AN ON-BOARD ELECTRICAL NETWORK SWITCH FOR MOTOR VEHICLES

(71) Applicant: Auto-Kabel Management GmbH, Hausen i.W. (DE)

(72) Inventors: David Cacciatore, Kempen (DE); Wacim Tazarine, Erkelenz (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 18/009,511

(22) PCT Filed: May 31, 2021

(86) PCT No.: PCT/EP2021/064482
§ 371 (c)(1),
(2) Date: Dec. 9, 2022

(87) PCT Pub. No.: WO2021/249799
PCT Pub. Date: Dec. 16, 2021

(65) Prior Publication Data
US 2023/0192018 A1    Jun. 22, 2023

(30) Foreign Application Priority Data
Jun. 10, 2020   (DE) .................... 10 2020 115 461.5

(51) Int. Cl.
*B60R 16/033*    (2006.01)
*B60L 3/00*    (2019.01)
*B60L 58/20*    (2019.01)

(52) U.S. Cl.
CPC .......... *B60R 16/033* (2013.01); *B60L 3/0046* (2013.01); *B60L 58/20* (2019.02); *B60L 2210/10* (2013.01); *B60L 2240/547* (2013.01)

(58) Field of Classification Search
None
See application file for complete search history.

(56) References Cited

U.S. PATENT DOCUMENTS

2017/0297517 A1*  10/2017  Fassnacht ........... B60R 16/0231

FOREIGN PATENT DOCUMENTS

| CN | 102496923 A | 6/2012 |
|----|-------------|--------|
| CN | 102696163 A | 9/2012 |

(Continued)

OTHER PUBLICATIONS

International Searching Authority/EP; International Search Report and Written Opinion of the International Searching Authority, Application No. PCT/EP2021/064482, dated Sep. 8, 2021, 11 pages.

(Continued)

*Primary Examiner* — Jared Fureman
*Assistant Examiner* — Aqeel H Bukhari
(74) *Attorney, Agent, or Firm* — Sunstein LLP (57) ABSTRACT

Motor vehicle on-board electrical network switch having at least two inputs for a respective one of at least two on-board power supplies, at least one output for a load of the motor vehicle, at least two switches, a first switch being disposed between a first of the inputs and a common node, and a second switch being disposed between a second of the inputs and the common node, and the output being electrically connected to the common node, wherein the switches are formed as semiconductor switches and are respectively connected with their body diodes in forward direction towards the common node, characterized in that a monitor- (Continued)

ing circuit monitors a first voltage at the first input and/or a second voltage at the second input and/or a voltage at the common node, and in that the monitoring circuit causes an opening signal for simultaneous opening of both switches depending on an amount of at least one of the monitored voltages.

15 Claims, 8 Drawing Sheets

(56) References Cited

FOREIGN PATENT DOCUMENTS

| CN | 109689436 A | 4/2019 |
|---|---|---|
| DE | 102010063744 A1 | 6/2011 |
| DE | 102011109709 A1 | 2/2013 |
| DE | 102015222545 A1 | 5/2017 |
| DE | 102016101081 A1 | 7/2017 |
| DE | 102016101855 A1 | 8/2017 |
| DE | 102019112271 A1 | 2/2020 |
| EP | 2017935 A2 | 1/2009 |
| EP | 2624399 A1 | 8/2013 |
| EP | 3792116 A1 | 3/2021 |
| JP | 2020-150784 A | 9/2020 |
| KR | 10-2014-0110386 A | 9/2014 |
| WO | 2016045836 A1 | 3/2016 |
| WO | 2019/063183 A1 | 4/2019 |

OTHER PUBLICATIONS

German Patent Office, Office Action issued on priority German Patent Application No. 10 2020 115 461.5, dated Feb. 26, 2020, 7 pages.
Korean Intellectual Property Office, Allowance of Patent, Application No. 10-2023-7000884, dated Sep. 7, 2023, 4 pages.
China National Intellectual Property Administration, Notification of the First Office Action, Application No. 202180041365.7, dated Aug. 26, 2023, 12 pages.

* cited by examiner

VEHICLE ON-BOARD ELECTRICAL NETWORK SWITCH FOR MOTOR VEHICLES, ON-BOARD ELECTRICAL NETWORK FOR MOTOR VEHICLES AND METHOD FOR OPERATING AN ON-BOARD ELECTRICAL NETWORK SWITCH FOR MOTOR VEHICLES

CROSS-REFERENCE TO RELATED APPLICATIONS

This application is the national phase entry of international patent application no. PCT/EP2021/064482 filed May 31, 2021 and claims the benefit of German patent application No. 10 2020 115 461.5 filed Jun. 10, 2020, the disclosures of which are incorporated herein by reference in their entirety.

TECHNICAL FIELD

The subject matter relates to a vehicle on-board electrical network switch, an on-board vehicle power supply system with such a switch, and a method for operating an vehicle on-board electrical network switch.

BACKGROUND ART

The increasing automation and automotive self-driving driving leads to increased safety requirements for electrical loads. Safety requirements also play an increasingly important role in the growing electrification of the powertrain.

Safety-relevant loads such as braking systems, steering systems, optical and/or radar-based environment sensors (LIDAR), control units and the like must be supplied with permanently stable electrical energy to enable safe automated and/or autonomous driving.

For this purpose, it is already proposed to provide at least two on-board power supplies. These on-board power supplies can redundantly supply the safety-relevant loads with electrical energy. An on-board electrical power supply can be, for example, a conventional lead-acid battery, a lithium-ion battery, a brake fuel cell or the like. An on-board electrical power supply can also be a generator, which is used as an alternator in internal combustion engines, for example.

Despite the redundant supply of the safety-relevant loads by two on-board power supplies, however, problems can arise in the event of voltage dips in the on-board power system connected to one of the on-board power supplies. A voltage dip in one of the on-board power supplies also leads to a voltage dip in the safety-relevant loads, despite connection to the second, redundant on-board electrical network. It is required that a voltage dip below a limit, for example 9V, may only occur for a certain time, for example only up to 0.5 ms, after which the voltage must again be above a limit, for example the said 9V.

The subject matter was based on the object of providing a motor vehicle on-board electrical network switch which ensures a stable connection of on-board power supplies to safety-relevant loads.

SUMMARY OF THE INVENTION

An on-board electrical network switch of the present invention comprises at least two inputs. The inputs may be formed as terminal lugs, crimp terminals, terminal studs, solder lugs or the like. The inputs may be routed into a common housing. The inputs can be made of aluminum or aluminum alloy as well as copper or copper alloy.

One of two on-board power supplies can be connected to each of the inputs. The on-board power supplies can be formed as already explained. The on-board power supplies are preferably each connected in parallel with the inputs and further loads. It is possible for an on-board electrical network to be exclusive to one or more safety-relevant loads and to be connected to them via the present motor vehicle on-board electrical network switch. However, it is also possible for at least one of the on-board power supplies to supply other loads, in particular loads that are not relevant to safety. Thus, exclusively an on-board electrical network and/or an on-board electrical network and further loads can be electrically contacted at the inputs.

The on-board power supplies can be batteries, accumulators, supercaps, generators, fuel cells or the like. In the case of the batteries or accumulators, lead-acid batteries or lithium-ion batteries are used in particular. At least one of the on-board power supplies may be directly short-circuited to an input via an electrical cable. At least one of the on-board power supplies may be connected to one of the inputs via an AC/DC rectifier or via a DC/DC converter.

An output for a load, in particular a safety-relevant load, of the motor vehicle can also be provided at the motor vehicle on-board electrical network switch. Mechanically, the output can be formed according to the above description to the inputs. The output may also be routed into the common housing.

One or a plurality of loads, in particular safety-relevant loads, may be connected to the output. The loads can be, for example, the loads mentioned above. The safety-relevant loads require an input voltage above a limit value, e.g. greater than 9V, and are designed to withstand voltage dips below this limit value for a certain time, for example a maximum of 0.5 ms. If the voltage drops below the limit value for a longer period of time, the safety-relevant loads may malfunction. Such malfunctions are unacceptable and not permitted in automated/autonomous driving.

Two switches can be provided within the vehicle electrical network switch, for example enclosed by a common housing, in particular also cast in a common housing, in particular as an integrated circuit. The switches serve to switch a respective electrical connection between a respective input and a common node of the motor vehicle electrical network switch.

A first switch may be disposed between the first input and the common node. In addition to the first switch, a second switch may be disposed between the second of the inputs and the common node.

At least one of the switches is, for example, a Normally Open switch that is closed when a corresponding control voltage is applied. However, at least one of the switches may also be a Normally Closed switch that is opened by application of a voltage.

The switches provide a respective electrical connection between the respective input and the common node. The common node is connected to the output. The potential of the common node can be tapped at the output.

In normal operation, electrical energy flows via the first and/or second switch from a respective on-board electrical network to the node, and from there via the output to the at least one load. In this case, the electrical energy generally flows from the on-board electrical network with the higher electrical potential compared to ground to the at least one load.

Due to the switches being closed during normal operation, equalizing currents can occur between the on-board power supplies. It is precisely these equalizing currents that are critical in the event of a fault on the part of one of the on-board power supplies and must be prevented, as will be described below.

For a particularly fast response as well as a small design and to guarantee the necessary energy in the event of a fault, it is proposed that the switches are formed as semiconductor switches and are each connected with their body diodes in the forward direction towards the common node. This means that in passive sign convention, electrical energy can flow from a respective on-board electrical network via the body diodes to the common node. In particular, a current flow direction from the input towards the common node is possible. Since both body diodes are each connected in the forward direction toward the common node, current flows in the passive sign convention from the node through the body diode to the input are impossible. Thus, the body diodes isolate the two on-board power supplies from each other when the switches are open. When the switch is closed, the current flows directly through the switch and only a non-relevant fraction flows through the body diodes. When the switch is open, current may flow in the direction of current flow from the input to the common node via the body diodes, although a voltage drop of 0.7V, for example, is possible here.

To protect safety-relevant loads, it is now proposed that a first voltage at the first input and a second voltage at the second input and/or a voltage at the common node are monitored with the aid of a monitoring circuit. In particular, the monitoring circuit measures the potential with respect to ground at the first and/or the second input and/or the common node. If in the following a voltage measurement is mentioned, this can be measured at at least one of the mentioned points.

The present motor vehicle on-board electrical network switch is connected in particular to the battery positive terminal, i.e. high side, so that a positive potential with respect to ground can be detected by the monitoring circuit. As explained previously, a voltage above a limit, for example 9V, is almost mandatory for safety-relevant loads. A voltage drop below this limit over too long a time will cause these loads to malfunction.

The two on-board power supplies provide the at least one load with an on-board voltage, for example 12V, 24V or 48V, via the vehicle electrical network switch, although other voltage limits are also possible. In particular, the voltages of the two on-board power supplies are almost identical.

In normal operation, the switches are closed. Via the closed switches, current can flow from the inputs to the output, from the output to the inputs, as well as between the inputs. The switches provide near short circuits between the inputs and the output. This means that if the voltage of one of the two on-board power supplies is too low, a compensating current flows from the on-board electrical network with the higher voltage to the on-board electrical network with the lower voltage. Such equalizing currents flow in addition to the currents from the on-board electrical network with the higher voltage to the load. This is not critical as long as the potential of the on-board electrical network with the lower voltage is high enough.

If there is a critical voltage drop in one of the on-board power supplies or the on-board power system connected to it, for example below the limit value, for example 9V, there are equalizing currents across the closed switches, which can lead to a corresponding voltage drop in the on-board electrical network and the on-board power system where no fault had originally occurred. The equalizing currents therefore lead to a voltage dip at the output, even though one of the on-board power supplies is functioning correctly.

To prevent this, it is now proposed that, depending on a magnitude of at least one of the monitored voltages, an opening signal is caused to open both switches simultaneously. That is, in the event of a fault, when a voltage dip occurs on the side of one of the two inputs, both switches are opened immediately and simultaneously.

Detecting a voltage dip as such is simple and fast. For example, it is only necessary to measure the potential at the common node. A simple voltage measurement is possible in a very short time. The fast reaction time, i.e. the fast measurement of the voltage dip, can cause a fast opening of the switches.

In particular, the reaction time between the detection of the voltage dip and the opening of the switches is below the critical limit for the loads, during which the voltage is allowed to fall below the limit. For example, this time is less than 0.5 ms. This means that with the present circuit, a voltage dip below the limit value can be limited to a duration that is shorter than the maximum permissible duration for the loads.

In conventional circuits, opening both switches would also interrupt the power supply to the load. This is prevented in the present case by the fact that the body diodes, which are connected in opposite directions, continue to provide a power supply in the forward opening towards the common node. From the on-board electrical network and the on-board electrical network in which there is no fault, a current continues to flow from the input via the body diode to the common node and the output or the load. However, equalizing currents are prevented by the other body diode in each case.

This circuit ensures that the two on-board power supplies are separated from each 30 other and equalizing currents are prevented at the moment a fault occurs, while at the same time ensuring a power supply to the loads with a substantially stable voltage at the output.

By ensuring a power supply with essentially stable voltage via the body diodes, it is then possible to evaluate in which of the two on-board power supplies the fault actually occurred. This evaluate may take longer than simply measuring the voltage level. However, since the load remains supplied with power at a substantially stable voltage, a longer time can be used for this purpose.

As soon as it has been determined which of the two vehicle electrical networks or which of the two vehicle electrical network power supplies caused the voltage dip, the other switch or the other connection to the vehicle electrical network power supply can be closed again and the load is supplied with energy with an essentially stable voltage via the intact vehicle electrical network power supply.

Closing the switch relieves the body diode. The body diode is designed to carry a high operating current only for a certain time. A voltage loss of 0.7V occurs across the body diode and the power loss causes the switch to heat up. Therefore, the switch must be closed to prevent destruction of the switch or the body diode.

According to one embodiment, it is proposed that the monitoring circuit causes the opening signal when at least one of the voltages falls below a threshold value. As explained above, the present vehicle on-board electrical network switch is preferably connected High Side of the battery, so that a fault is caused by a voltage dip. This voltage dip below a threshold value, for example 9V, can be detected, for example immediately at the node. When the voltage dip has been detected, the opening signal is output so that equalizing currents are immediately prevented.

According to one embodiment, it is proposed that the monitoring circuit causes the opening signal when a short circuit occurs at at least one of the inputs. A possible reason for a voltage dip may be a short circuit. In the case of a short circuit, the voltage collapses very rapidly with a steep edge. Both the current of the power supply connected to the vehicle electrical network where the short circuit occurs and the current of the vehicle electrical network supply connected on the other side of the vehicle electrical network switch, to the intact vehicle electrical network, flow across the short circuit, with this current flowing across the two switches in the manner of a compensating current. The short also short-circuits the load so that it is no longer supplied with power and/or substantially stable voltage.

By simultaneously opening the switches immediately after the short circuit is detected, this equalizing current is prevented and the load no longer "sees" the short circuit. The on-board electrical network of the intact on-board power system also no longer "sees" the short circuit, since the body diode is connected in the reverse direction towards the short circuit.

According to an embodiment, it is proposed that the monitoring circuit compares at least one of the voltages with a comparison potential, in particular a ground potential. The monitoring circuit measures the voltage with respect to the ground potential. When a voltage dip occurs at one of the inputs, this voltage dip also occurs at the other input and the node, since the two inputs are short-circuited to each other via the closed switches and the node. To then prevent equalizing currents, the switches are opened immediately.

According to an embodiment, it is proposed that the monitoring circuit immediately after causing the opening signal evaluates a respective state of at least a part of the on-board electrical network at the first input and at least a part of the on-board electrical network at the second input and, depending on the evaluation, causes a closing signal for exactly one, preferably only the first or only the second switch. The closing signal is triggered for only exactly one of the two switches. The closing signal is triggered for that switch which is connected to the input at which the on-board electrical network is fault-free. The switch connected to the input at which the on-board power system is faulty remains open.

According to one embodiment, it is proposed that the monitoring circuit evaluates a mains impedance and/or a voltage and/or an impulse response at the part of the on-board mains at the first input and the part of the on-board mains at the second input. For example, voltage may be measured at the first input and/or the second input and/or the node. Additionally, current as well as current flow direction may be measured at the first input and/or at the second input and/or at the node. The measured values may be digitized by an AD converter and processed in a processor. Depending on the processing, the monitoring circuit may output the closure signal.

To avoid misunderstandings, it should be noted that the part of the on-board electrical network at the first input and the part of the on-board electrical network at the second input are each to be understood as including at least the connection of the input to the respective on-board electrical network. Furthermore, a connection to at least one, preferably several, further loads connected to the respective on-board electrical network may be meant. Thus, a part of an on-board electrical network may be formed by the on-board electrical network and/or loads connected thereto.

According to an embodiment, it is proposed that the semiconductor switches are dimensioned such that a voltage drop at a respective body diode after opening of the switch is less than 1V, preferably less than 0.7V. When the switch is open, a current flows through the body diode in the forward direction from the intact on-board electrical network to the load. This current causes a voltage drop of preferably 1V, in particular 0.7V or less across the body diode. However, this voltage drop is not critical for the safety-relevant load, since the voltage of the on-board electrical network minus the voltage drop across the body diode is greater than the minimum voltage for the load, in particular the safety-relevant load.

According to an embodiment, it is proposed that the monitoring circuit triggers the closing signal within 100 ms, preferably 40 ms after the opening signal. The monitoring circuit thus has between 40 and 100 ms to evaluate the two parts of the two on-board electrical network s beyond the two inputs and to determine on which side the fault, in particular the short-circuit, occurred that led to the voltage dip. If the correct side where the fault occurred is detected, the other side is connected to the load by closing the switch.

According to one embodiment, it is proposed that after the switches are opened, the output is conductively connected to the first and second inputs via the respective body diodes, and the body diodes allow current to flow from the respective input to the output. As explained above, current flow is enabled in the passive sign convention from the on-board electrical network to the output. However, the body diodes block current flow from the higher potential to the lower potential in passive sign convention. This prevents an equalizing current between the on-board power system, which is intact, and the on-board power system, which is faulty and caused the voltage dip. Since it is not yet clear at the time of the voltage dip which of the two vehicle electrical networks caused the voltage dip, both switches are opened. However, a power supply to the load at the output with a substantially stable voltage remains ensured via the body diodes.

According to one embodiment, it is proposed that after the switches are opened, the output is conductively connected to the first and second inputs via the respective body diodes, but the body diodes block a current flow from the output to the respective input. Thus, current flow from the common node to the input is also blocked by the body diodes.

According to an embodiment, it is proposed that at least one of the semiconductor switches is switched with a variable switching characteristic, in particular that the switching characteristic is dependent on a load at the output. In this case, the switching behavior of the semiconductor switch, in particular a dependence on the current and/or the voltage, can be adjusted by software. A dynamic load which, for example, has a high starting current during start-up and requires a lower current during normal operation can also be protected in a variable manner by flexibly defining the switching characteristic, e.g. how much current flows for how long (dI/dt).

As already explained at the beginning, a safety-relevant load mentioned above can be connected to the output according to an embodiment. Especially for the safety-relevant loads, a continuous power supply in a redundant manner has to be ensured.

According to an embodiment, it is proposed that the output is short-circuited to the common node. Preferably, no further component is provided in the vehicle electrical network switch between the common node and the output.

Another aspect is a motor vehicle electrical network comprising a motor vehicle on-board electrical network switch as previously described, a first electrical network power supply connected to the first input, a second electrical network power supply connected to the second input, and a safety-relevant load connected to the output.

In another aspect, there is provided a method of operating an automotive on-board electrical network switch as previously described. In this method, at least one voltage is monitored. In particular, this also means that a voltage at a common node is monitored. In the case of closed switches, the voltages at the inputs and the common node are almost identical and differ only by the voltage drop across the respective switches, this being in the range of a few 100 mV. Depending on a magnitude of at least one of the voltages, both switches are opened simultaneously.

Alternatively or cumulatively to the magnitude of the voltage, a rate of change of the voltage may be relevant and/or a differential of the voltage may be considered. For example, if the differential drops above a negative limit, it may be concluded that there is a rapid voltage drop caused by a fault that may lead to opening of the switches.

After the simultaneous opening of the switches, a power supply via the body diodes is possible, since this connects a respective potential of the on-board electrical network to the output in the forward direction. The on-board electrical network with the higher potential causes a current flow via the body diode to the load. The on-board electrical network at which the voltage dip occurred has the lower potential and no current flows from it via the body diode in the forward direction to the common node and the load. Since the body diode is operated in the reverse direction, the intact on-board power supply does not "see" the defective on-board power supply and no equalizing currents flow.

After the switches are opened simultaneously, the electrical status of the two on-board power supplies is evaluated.

Depending on the evaluation, the on-board electrical network and the on-board electrical network in which no fault has occurred are connected to the common node and the output via the switch. The one on-board electrical network and the one on-board electrical network in which the fault occurred remain disconnected from the load and the other on-board electrical network via an open switch.

BRIEF DESCRIPTION OF THE DRAWINGS

In the following, the subject matter is explained in more detail with reference to drawings showing embodiments. The drawings show:

FIG. 3 a-f switching states of a motor vehicle on-board electrical network switch according to embodiments.

DETAILED DESCRIPTION OF SPECIFIC EMBODIMENTS

Figure 1:
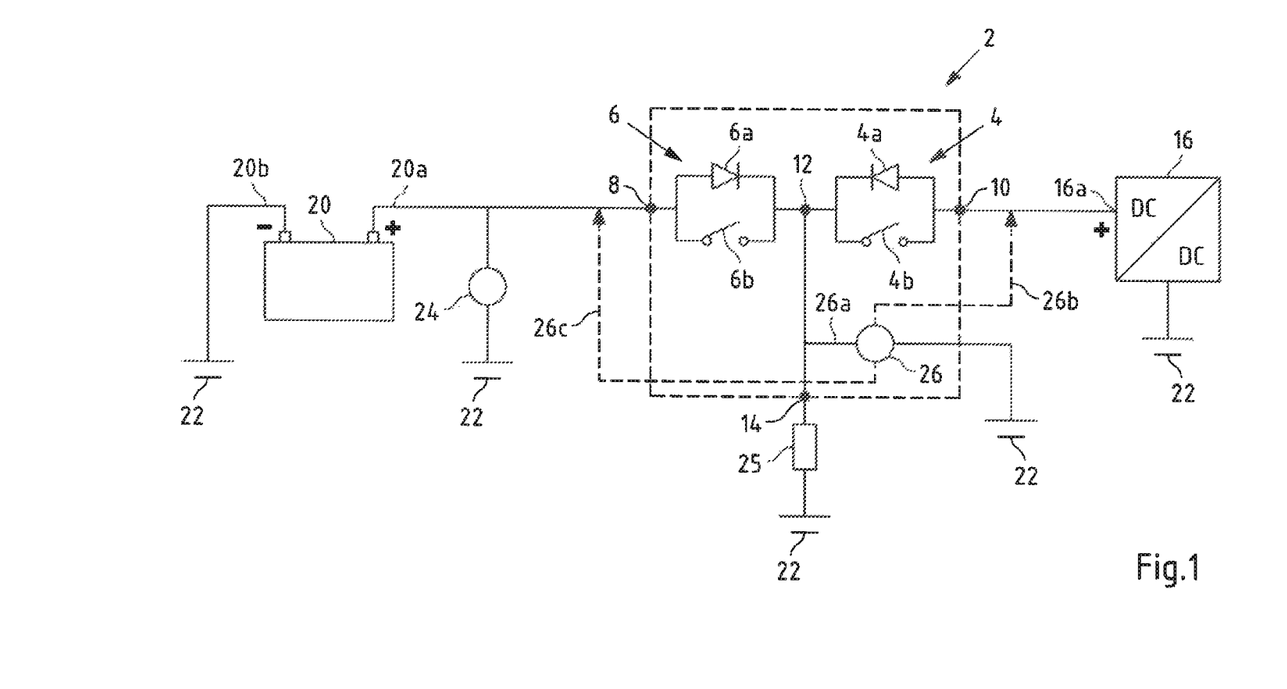
FIG. 1 a block diagram according to an embodiment.

FIG. 1 shows a motor vehicle on-board electrical network switch 2 in a motor vehicle on-board electrical network. The motor vehicle on-board electrical network switch 2 has two switches 4, 6. The first switch 4 is connected to a first vehicle electrical network power supply 16 via an input contact 10. The second switch 6 is connected to a second on-board electrical network 20 via an input contact 8. The switches 4, 6 are short-circuited to each other within the vehicle electrical network switch 2 via a common node 12. The node 12 is connected to an output contact 14.

The input contacts 8, 10 and the output contact 14 can be formed as connection lugs, connection terminals, plug-in contacts, crimp contacts, connection bolts, welding lugs, soldering lugs or the like.

The first on-board electrical network 16 is, for example, a DC/DC converter connected at its high-side potential 16a to the input contact 10.

The second on-board electrical network 20 is, for example, a battery connected on its B+ potential 20a to the input contact 8 and connected on its B− contact 20b to ground 22.

The second on-board electrical network 20 supplies an on-board electrical network 24, for example. The first on-board electrical network 16 can also supply an on-board electrical network, but this is not shown.

A load 25 is connected to the output contact 14. The load 25 is, for example, a safety-relevant load.

The switches 4, 6 in the motor vehicle on-board electrical network switch 2 each comprise a switching element 4b, 6b and a body diode 4a, 6a. The switches 4, 6 are, for example, semiconductor switches, in particular high-power semiconductor switches, for example MOSFETs, IGBTs or the like.

In FIG. 1, it can be seen that the body diodes 4a, 6a are each switched in the forward direction from an input contact 8, 10 toward the common node 12.

The switching elements 4b, 6b can be controlled via a switching signal (not shown). Such actuation can be performed, for example, via a monitoring circuit 26. The switches 4a, 4b may be Normally Opened (NO), for example, and an open signal may be a decrease in a switching signal level. The switching elements 4b, 6b may also be Normally Closed (NC) and an open signal may be an increase in a switching signal level.

The monitoring circuit 26 is connected to the common node 12 via a sense line 26a and may, for example, measure the potential of the common node 12 with respect to ground 22. In addition, the monitoring circuit 26 is connected to the respective on-board power supplies at the on-board power supplies 16, 20 via sensing lines 26b, c. The sensing lines 26b, c can be used to determine a condition of the respective on-board electrical network, such as an impedance, an impulse response, a resistance to ground, or the like.

With the aid of the motor vehicle on-board electrical network switch 2 shown, it is possible to connect the safety-relevant load 25 redundantly and permanently to at least one of the on-board power supplies 16, 20, even in the event of a fault.

Figure 2A:
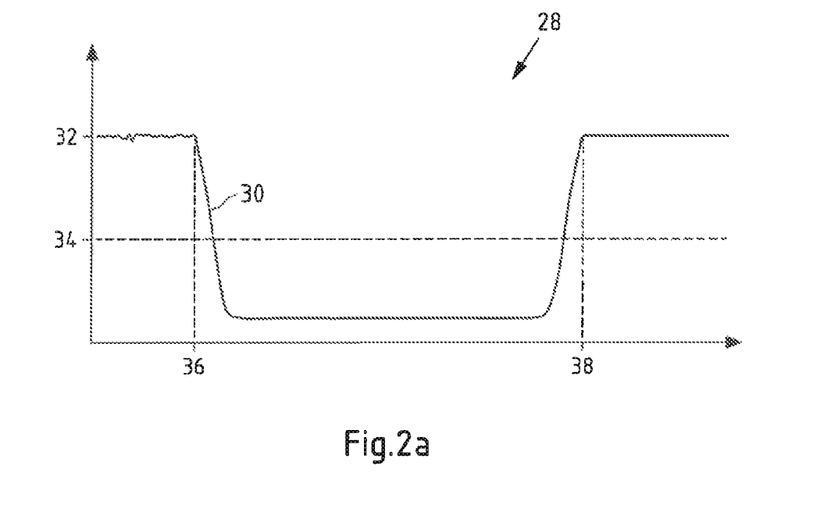
FIG. 2a, b voltage curves at the common node.

Such a fault case is shown in FIG. 2a. FIG. 2a shows exemplarily and purely schematically a voltage curve 28 at the common node 12. A standard voltage 32 is present at the common node 12 in the normal case. In the normal case, the switching elements 4b, 6b are closed. The standard voltage 32 results from the respective higher potential of one of the two on-board power supplies 16, 20.

In the event of a fault, the edge 30 in the voltage 28 drops steeply. This can occur, for example, at time 36. The steeply falling edge 30 causes the voltage 28 to fall below a lower limit value 34. In conventional circuits, it takes until time 38 for the faulty on-board electrical network 16, 20 to be disconnected from the common node. In this case, time point 38 may be, for example, 40 to 100 ms after time point 36. The interval between the time points 36, 38 is above the maximum permissible duration of a voltage dip below the limit value 34 for a safety-relevant load, e.g. 0.5 ms.

By falling below the lower limit value 34 for more than 0.5 ms, a fault of the safety-relevant load 25 can no longer be excluded.

Figure 2B:
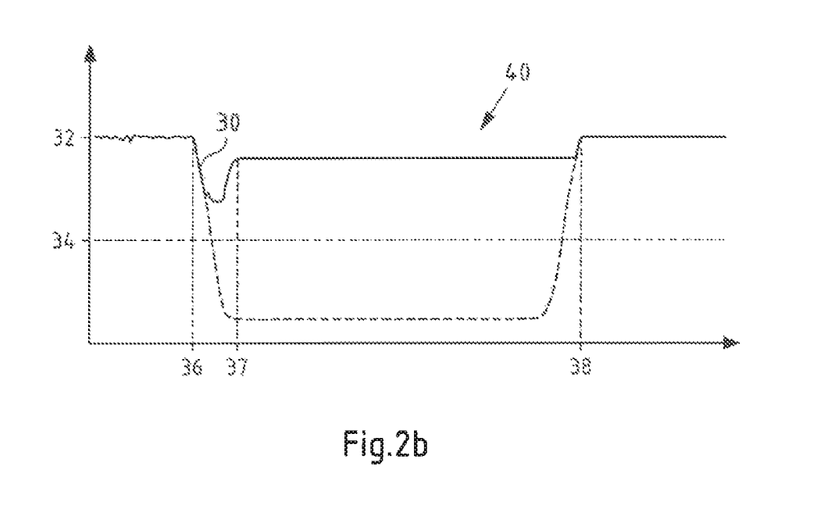

This can be remedied by a motor vehicle on-board electrical network switch 2 in which a voltage curve 40 as shown in FIG. 2b can be implemented. FIG. 2b is described in connection with FIGS. 3a to f.

Figure 3A:
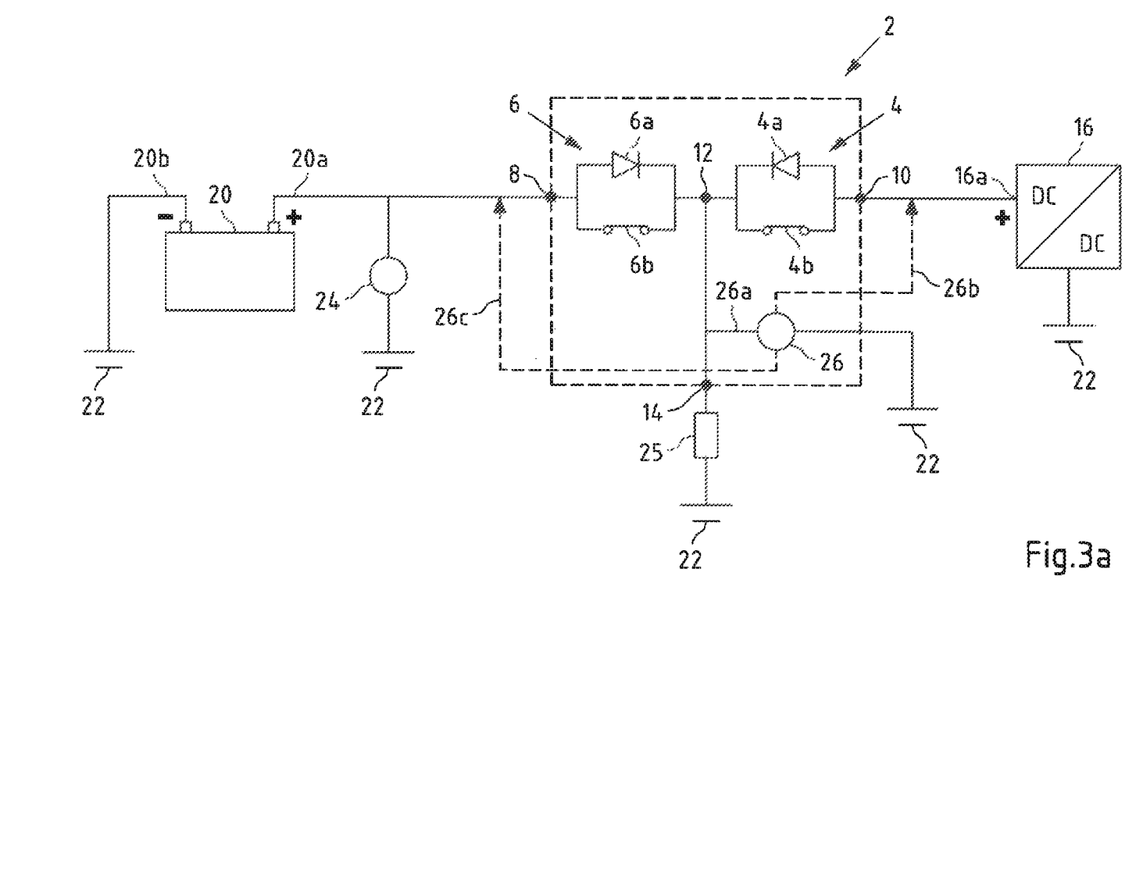

In FIG. 3a, it can be seen that the switching elements 4b, 6b are closed. This is the normal state. The standard voltage 32 flows from the on-board power supplies 16, 20 via the switching elements 4b, 6b and the common node 12 to the load 25.

Figure 3B:
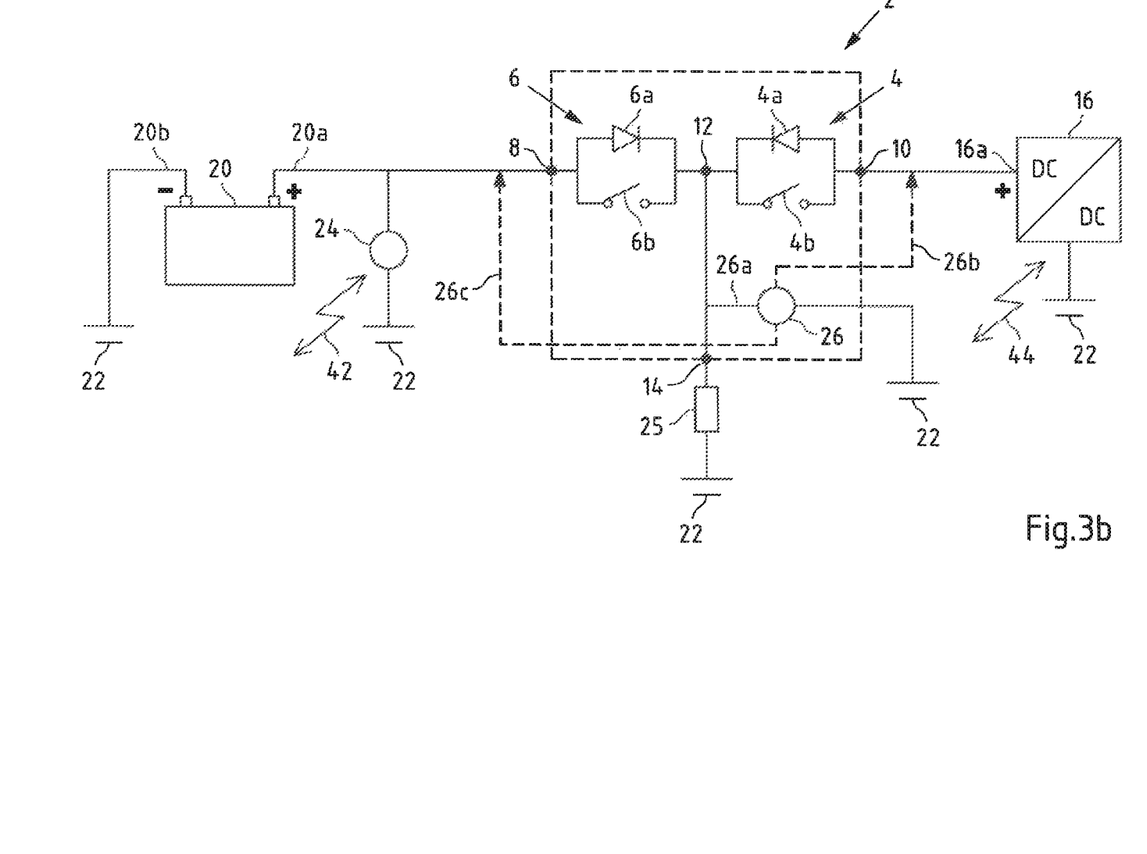

FIG. 3b shows that a fault, for example a short circuit 42, 44, can occur on the side of one of the two on-board power supplies 16, 20, starting from the input contacts 8, 10. In such a case, the edge 30 of the voltage 40 drops steeply. This steep slope 30 can be detected via the monitoring circuit 26. This detection can be completed very quickly after the time 36 at the time 37. In this case, both switching elements 4b, 6b are opened immediately by the monitoring circuit 26. In particular, time point 37 is at most 0.5 ms after time point 36. Since it is not known which of the short circuits 42, 44 has occurred, both switching elements 4a, 6a are initially opened.

Figure 3C:
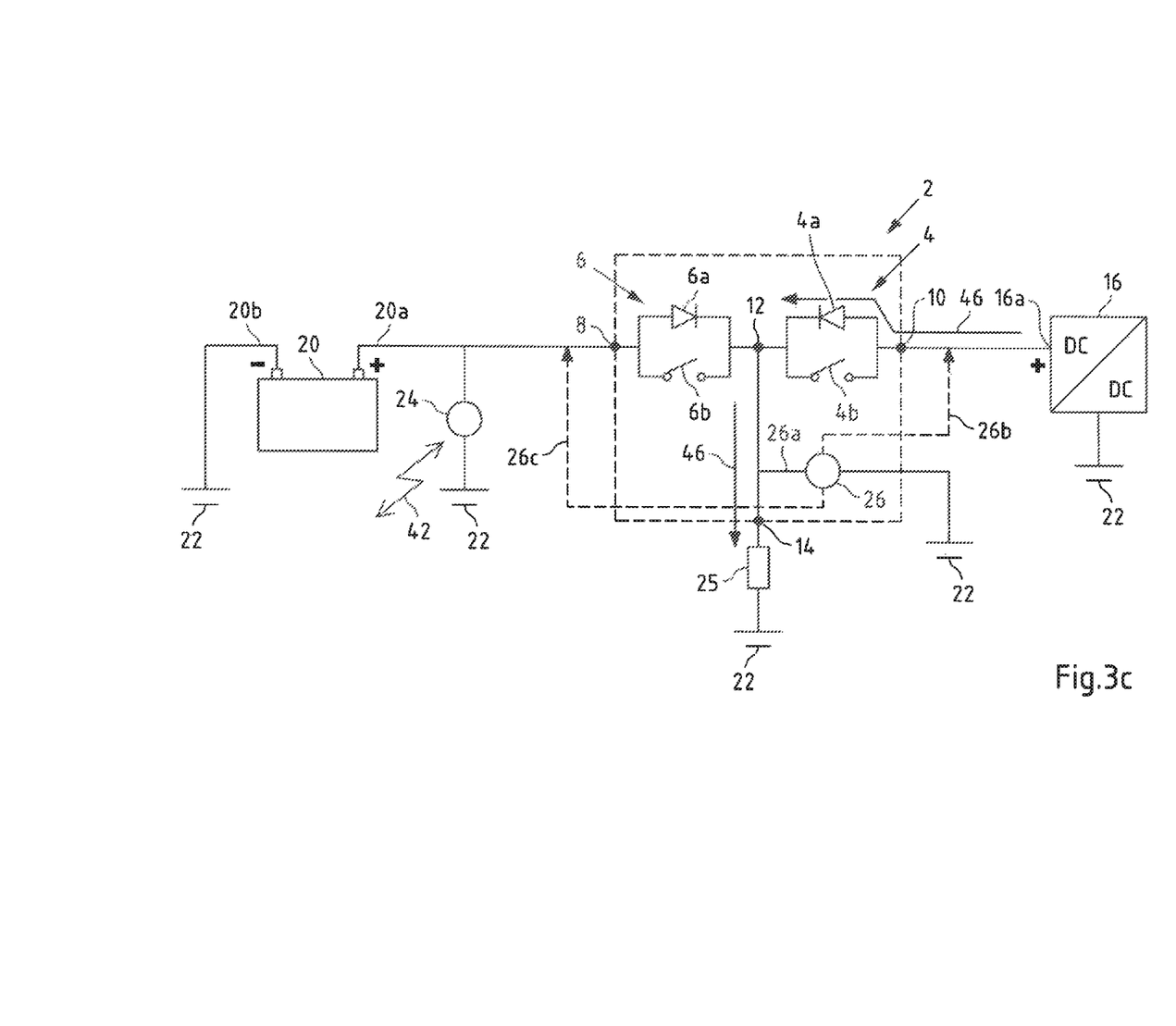

FIG. 3c shows an example in which a short circuit 42 has occurred on the side of the on-board electrical network 20. After both switching elements 4b, 6b have been opened by the monitoring circuit 26, as shown in FIG. 3c, a current flow 46 can still flow from the positive pole 16a of the on-board electrical network 16 via the body diode 4a to the load This is shown in FIG. 2b. There it can be seen that after the falling edge 30 at time 37, the voltage 40 stabilizes again. The voltage 40 is 0.7 to 1V below the standard voltage 32, which is due to the voltage drop across the body diode 4a.

In the period between times 36, 38, the monitoring circuit 26 can measure and evaluate where the fault is via the sensing lines 26b, c in the respective on-board power supplies 16, 20.

Figure 3D:
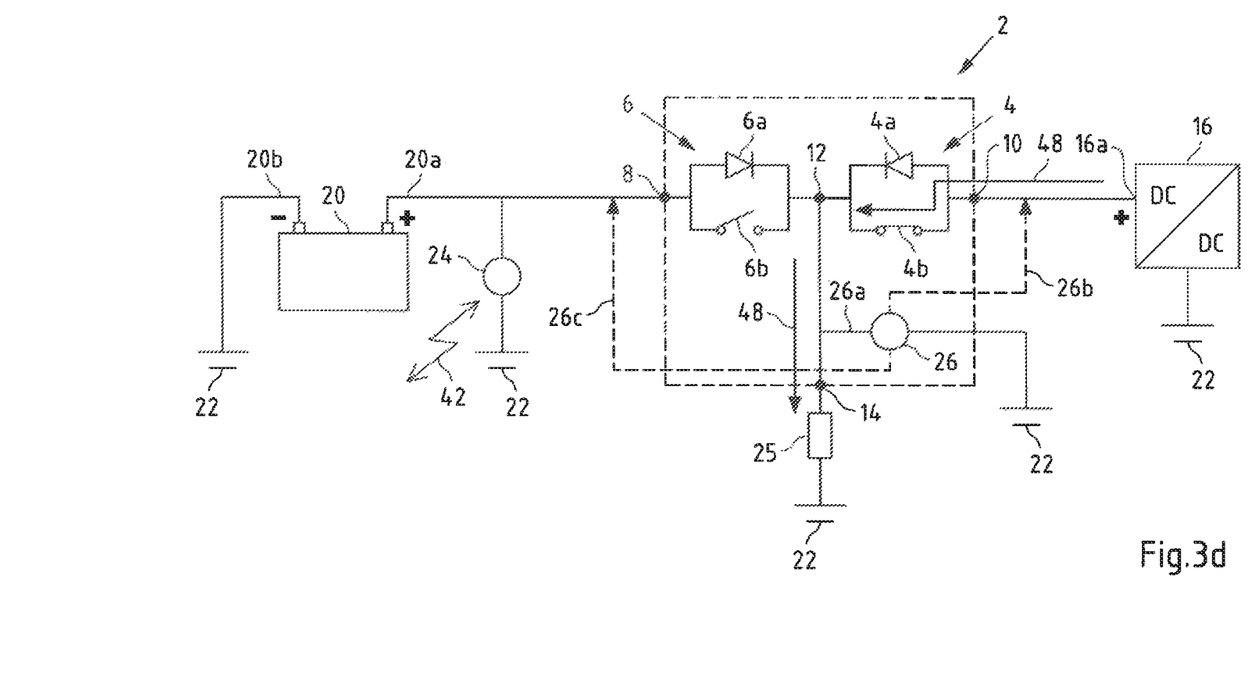

In FIG. 3d, it is shown that the fault has been sensed on the side of the on-board electrical network 20. In this case, the switching element 4b is closed. As can be seen in FIG. 3d, the current flow 48 occurs via the switching element 4b.

In FIG. 3b, it can be seen that this results in an increase in voltage 40 to standard voltage 32 at time 38, i.e. when it has been determined where the fault is located. In FIG. 3b it can be seen that at no time did the voltage fall below the limit 34.

Figure 3E:
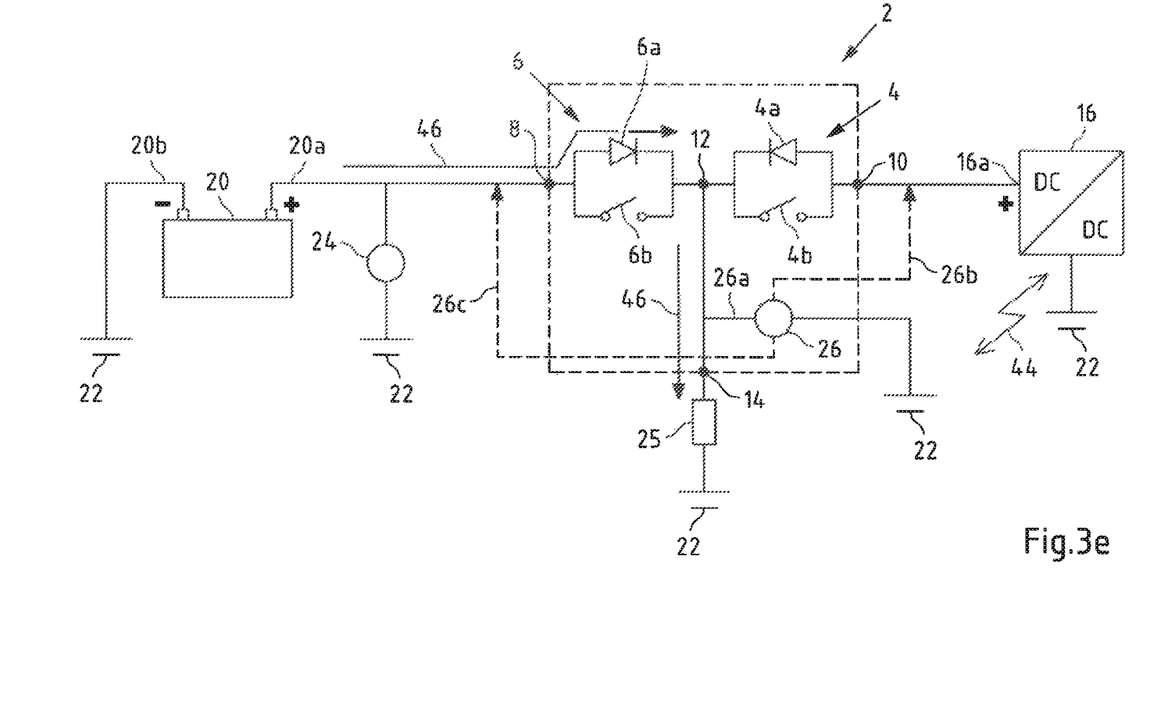

FIG. 3e shows a case in which the short circuit 44 has occurred on the side of the on-board electrical network 16. This short circuit 44 also leads to a falling edge 30 and immediate opening of the switching elements 4b, 6b. Since the on-board electrical network 20 is still operating fault-free, this leads to a current flow 46 across the body diode 6a, as shown in FIG. 3e. The voltage waveform is as shown in FIG. 2b.

As described for FIG. 3c, the monitoring circuit 26 is used to measure into the two on-board circuits beyond the input contacts 8, 10 and to evaluate on which side the fault lies.

Figure 3F:
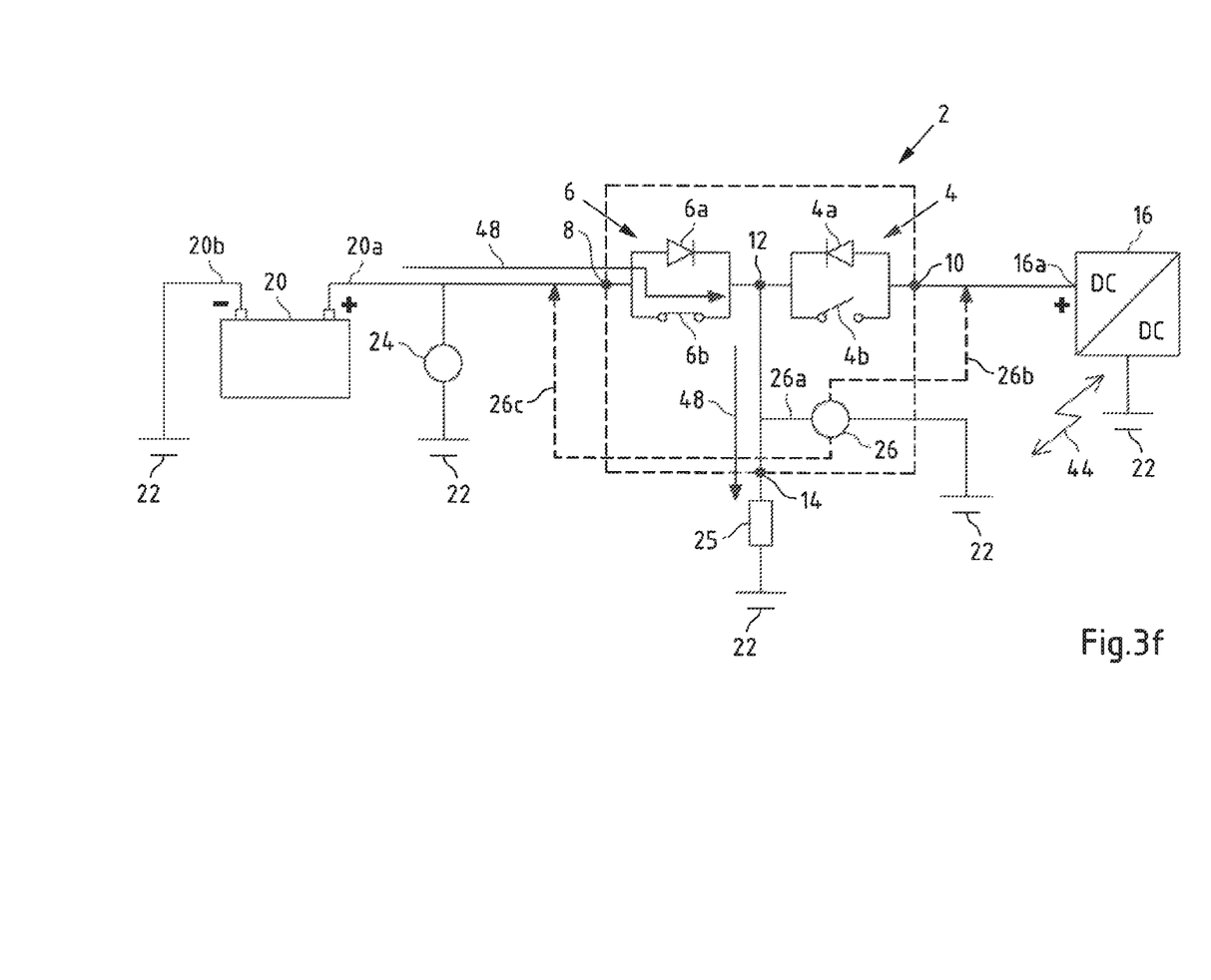

If the fault is on the side of the on-board electrical network 16, the switching element 6b can be closed again, as shown in FIG. 3f. This is time 38. A current flow 48 takes place from the on-board electrical network 20 via the switching element 6b to the load 25. Here, too, it is ensured that at no time does the voltage fall below the limit value 34.

With the aid of the arrangement shown, it is possible to design a redundant on-board electrical network in such a way that a voltage drop below a critical limit value for safety-relevant loads is avoided.

What is claimed is:

1. Motor vehicle on-board electrical network switch comprising:
   at least two inputs for respectively one of at least two on-board power supplies;
   at least one output for a load of the motor vehicle;
   a first switch disposed between a first of the inputs and a common node;
   a second switch disposed between a second of said inputs and said common node;
   wherein the at least one output is electrically connected to the common node,
   wherein the first and second switches are semiconductor switches and are respectively connected with their body diodes in forward direction towards the common node,
   wherein a monitoring circuit monitors a first voltage at the first input and/or a second voltage at the second input and/or a voltage at the common node, and in that the monitoring circuit triggers an opening signal for simultaneous opening of both switches as a function of a magnitude of at least one of the monitored voltages.

2. Motor vehicle on-board electrical network switch according to claim 1, wherein the monitoring circuit triggers the opening signal when at least one of the voltages falls below a limit value.

3. Motor vehicle on-board electrical network switch according to claim 1, wherein the monitoring circuit triggers the opening signal in the event of a short circuit at at least one of the inputs.

4. Motor vehicle on-board electrical network switch according to claim 1, wherein the monitoring circuit compares at least one of the voltages with a comparison potential, in particular a ground potential.

5. Motor vehicle on-board electrical network switch according to claim 1, wherein the monitoring circuit evaluates a respective state of a part of the vehicle electrical network at the first input and of a part of the vehicle electrical network at the second input immediately after the opening signal is triggered and, depending on the evaluation, triggers a closing signal for one, preferably only the first or only the second switch.

6. Motor vehicle on-board electrical network switch according to claim 5, wherein the monitoring circuit evaluates a mains impedance and/or a voltage and/or an impulse response at the part of the vehicle electrical network at the first input and the part of the vehicle electrical network at the second input.

7. Motor vehicle on-board electrical network switch according to claim 1, wherein the semiconductor switches are dimensioned in such a way that a voltage drop at a respective body diode after the switch is opened is less than 1V, preferably less than 0.7V.

8. Motor vehicle on-board electrical network switch according to claim 1, wherein the monitoring circuit is configured to trigger the closing signal within 100 ms, preferably 40 ms, after the opening signal.

9. Motor vehicle on-board electrical network switch according to claim 1, wherein after opening of the switches, the output is conductively connected to the first and second inputs via the respective body diodes, and the body diodes enable a current flow from the respective input to the output.

10. Motor vehicle on-board electrical network switch according to claim 1, wherein after opening of the switches, the output is conductively connected to the first and the second input via the respective body diodes and the body diodes block a current flow from the output to the respective input.

11. Motor vehicle on-board electrical network switch according to claim 1, wherein at least one of the semiconductor switches is connected with a variable switching characteristic, in particular in that the switching characteristic is dependent on a load at the output.

12. Motor vehicle on-board electrical network switch according to claim 1, wherein a safety-relevant load is connected to the output.

13. Motor vehicle on-board electrical network switch according to claim 1, wherein the output is short-circuited to the common node.

14. Motor vehicle electrical network comprising:
  a motor vehicle on-board electrical network switch according to claim 1;
  a first on-board electrical power supply connected to the first input;
  a second on-board electrical power supply connected to the second input; and
  a safety-relevant load connected to the output.

15. Method of operating a motor vehicle on-board electrical network switch according to claim 1, comprising:
  monitoring a first voltage at the first input and/or a second voltage at the second input and/or a voltage at the common node and, depending on a magnitude of at least one of the monitored voltages, both switches are opened simultaneously,
  wherein, after the simultaneous opening of the two switches, the body diodes of the two switches connect a respective potential of the on-board electrical network to the output in the forward direction,
  wherein, after the simultaneous opening of the two switches, the electrical state of the two on-board power supplies is evaluated and, depending on the evaluation, one of the two switches is closed.

* * * * *